(12) United States Patent
Takubo

(10) Patent No.: US 9,297,588 B2
(45) Date of Patent: Mar. 29, 2016

(54) HEAT EXCHANGER

(75) Inventor: Sadao Takubo, Takehara (JP)

(73) Assignee: Takubo Machine Works Co., Ltd, Hiroshima-Ken (JP)

( * ) Notice: Subject to any disclaimer, the term of this patent is extended or adjusted under 35 U.S.C. 154(b) by 698 days.

(21) Appl. No.: 13/301,940

(22) Filed: Nov. 22, 2011

(65) Prior Publication Data

US 2012/0132405 A1     May 31, 2012

(30) Foreign Application Priority Data

Nov. 29, 2010    (JP) ................................ 2010-264848

(51) Int. Cl.
    *F28D 7/10*           (2006.01)
    *F28D 7/02*           (2006.01)
    *F28F 3/00*           (2006.01)
                (Continued)

(52) U.S. Cl.
    CPC .......... *F28D 9/0025* (2013.01); *B05B 15/1222* (2013.01); *F26B 23/002* (2013.01); *F26B 23/02* (2013.01); *F28D 21/001* (2013.01); *F28D 21/0014* (2013.01); *F28F 3/044* (2013.01); *F28F 9/001* (2013.01); *F28F 9/0075* (2013.01); *F26B 21/02* (2013.01); *F28F 2230/00* (2013.01);
                (Continued)

(58) Field of Classification Search
    CPC ............. F28F 9/001; F28F 9/002; F28F 9/02; F28F 9/0219; F28F 9/0226; F28F 9/0241; F28D 9/0006; F28D 9/0025; F28D 21/0003; F28D 1/0358
    USPC .......... 34/60, 86, 90; 165/157, 162, 166, 164; 277/630, 637, 644
    See application file for complete search history.

(56) References Cited

U.S. PATENT DOCUMENTS 2,019,351 A * 10/1935 Lathrop ........................ 165/165
2,064,928 A * 12/1936 Lewis ........................... 165/166

(Continued)

FOREIGN PATENT DOCUMENTS

CH          657692 A5    9/1986
CN          2729573 Y    9/2005

(Continued)

OTHER PUBLICATIONS

European Communication completed Jun. 20, 2013 in corresponding European Patent Application No. EP 11009266.5

(Continued)

*Primary Examiner* — Allen Flanigan
*Assistant Examiner* — Jason Thompson
(74) *Attorney, Agent, or Firm* — Nields, Lemack & Frame, LLC

(57) ABSTRACT

A heat exchanger comprises a casing designed as a hollow box by a top plate, a bottom plate, a front plate, a rear plate, and two lateral plates and a heat transfer unit accommodated in the casing. The heat transfer unit has flat plates alternately folded back in reverse direction. A first flow passage and a second flow passage are alternately formed in multiple layers between the flat plates. A high temperature fluid inlet and a high temperature fluid outlet in communication with the second flow passage are provided on the front plate side. A low temperature fluid inlet and a low temperature fluid outlet in communication with the first flow passage are provided on the rear plate side. Biasing means applies pressure on the lateral plate sealing member to the end portion of the heat transfer unit and seals the end portions of the first and second flow passages.

4 Claims, 6 Drawing Sheets

(51) Int. Cl.
*F28D 9/00* (2006.01)
*F28F 3/04* (2006.01)
*F28F 9/00* (2006.01)
*F28F 9/007* (2006.01)
*F28D 21/00* (2006.01)
*B05B 15/12* (2006.01)
*F26B 23/00* (2006.01)
*F26B 23/02* (2006.01)
*F26B 21/02* (2006.01)

(52) U.S. Cl.
CPC ............. *F28F 2280/02* (2013.01); *Y02P 70/40* (2015.11); *Y02P 70/405* (2015.11)

(56) References Cited

U.S. PATENT DOCUMENTS

| | | | |
|---|---|---|---|
| 2,321,110 A | | 6/1943 | Shipman |
| 3,829,945 A | | 8/1974 | Kanzler et al. |
| 3,986,549 A | * | 10/1976 | Huggins et al. .............. 165/82 |
| 4,043,388 A | * | 8/1977 | Zebuhr ........................ 165/166 |
| 4,131,159 A | | 12/1978 | Long |
| 4,384,611 A | * | 5/1983 | Fung ........................... 165/166 |
| 4,776,387 A | * | 10/1988 | Newman ....................... 165/76 |
| 4,848,451 A | * | 7/1989 | Jonsson et al. ............... 165/167 |
| 4,872,504 A | * | 10/1989 | Huebner ....................... 165/54 |
| 4,887,869 A | | 12/1989 | Nishii et al. |
| 5,303,771 A | | 4/1994 | Des Champs |
| 5,494,100 A | | 2/1996 | Peze |
| 5,823,767 A | | 10/1998 | Watanabe et al. |
| 6,209,223 B1 | * | 4/2001 | Dinh .............................. 34/86 |
| 6,289,977 B1 | | 9/2001 | Claudel et al. |
| 6,408,941 B1 | * | 6/2002 | Zuo .............................. 165/165 |
| 6,742,284 B2 | * | 6/2004 | Dinh .............................. 34/514 |
| 2004/0206486 A1 | * | 10/2004 | Whittenberger ............. 165/165 |
| 2005/0229921 A1 | | 10/2005 | Krupp |
| 2006/0060336 A1 | | 3/2006 | Calanni et al. |
| 2009/0229804 A1 | * | 9/2009 | Zebuhr ........................ 165/166 |
| 2013/0160970 A1 | | 6/2013 | Takubo |
| 2015/0013952 A1 | | 1/2015 | Takubo |

FOREIGN PATENT DOCUMENTS

| | | |
|---|---|---|
| DE | 20309327 U1 | 9/2003 |
| EP | 1251325 A2 | 10/2002 |
| EP | 1635131 A1 | 3/2006 |
| EP | 2047913 A1 | 4/2009 |
| GB | 243093 A | 11/1925 |
| JP | 36-21644 A | 11/1961 |
| JP | 49-80457 U | 7/1974 |
| JP | 60-37293 U | 3/1985 |
| JP | 60-80094 A | 5/1985 |
| JP | 63-116098 A | 5/1988 |
| JP | 63-135790 A | 6/1988 |
| JP | 1-106768 A | 4/1989 |
| JP | 6-506054 A | 7/1994 |
| JP | 10-154887 A | 6/1998 |
| JP | 11-248388 A | 9/1999 |
| JP | 2001-502409 A | 2/2001 |
| JP | 2005-195191 A | 7/2005 |
| JP | 2013-132607 A | 7/2013 |

OTHER PUBLICATIONS

Japanese Communication, with English translation, mailed May 1, 2012 in corresponding Japanese Patent Application No. JP 2010-264848.

Chinese Communication, with English translation, issued Jan. 6, 2014 in corresponding Chinese patent application No. 201110386774.9.

Japanese communication dated Jul. 8, 3014 in co-pending Japanese patent application No. 2013-145627.

European communication dated Nov. 11, 2014 in co-pending European patent application No. 14169687.2.

\* cited by examiner

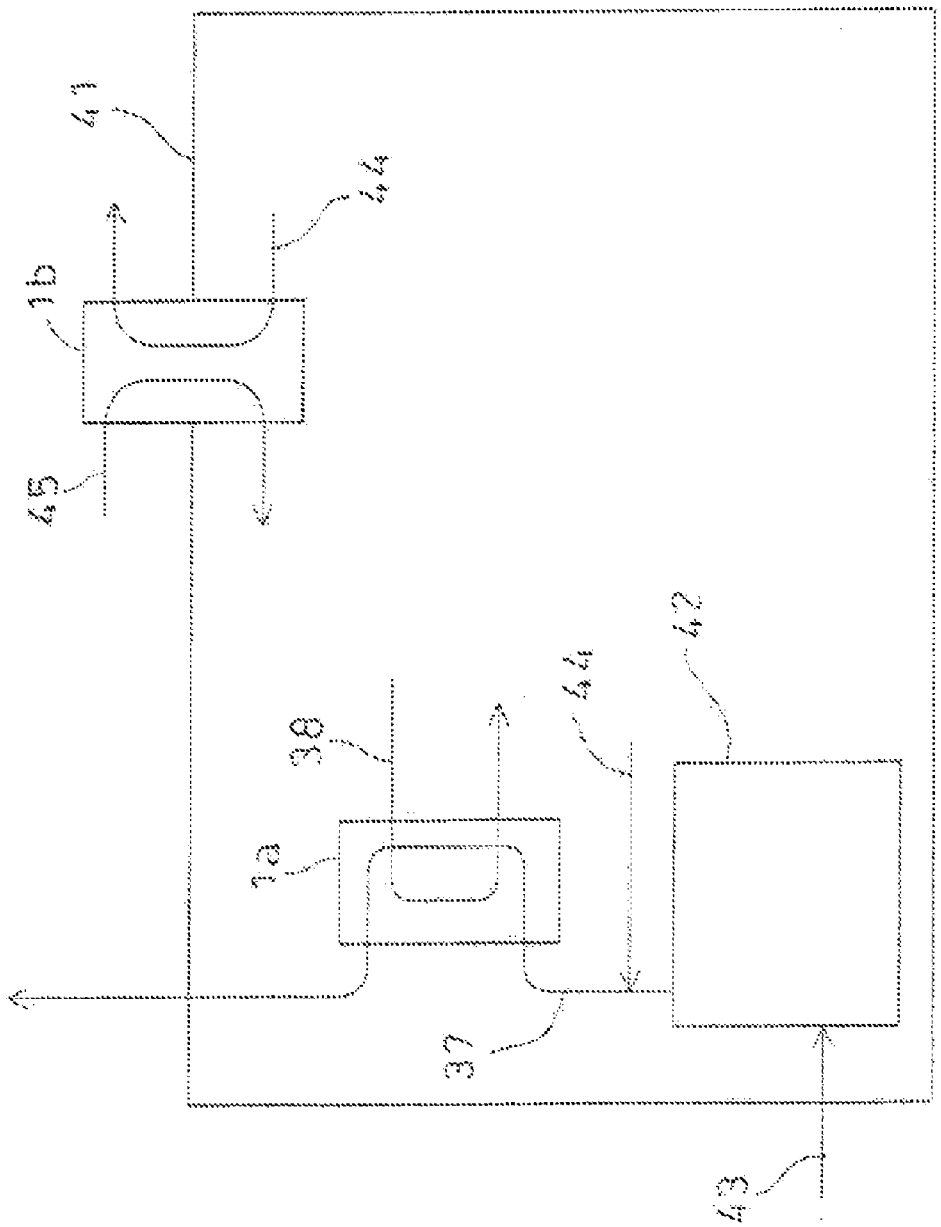

HEAT EXCHANGER

BACKGROUND OF THE INVENTION

The present invention relates to a flat-plate type heat exchanger.

As a conventional type heat exchanger, a heat exchanger is disclosed in the Japanese Patent Gazette JP-A-Sho-36-21644. The Japanese Patent Gazette JP-A-Sho-36-21644 discloses a heat transfer unit, wherein projections are formed in a predetermined distribution on a flat plate, the flat plate is folded back in multiple layers alternately with a predetermined width, a gap for the projection is formed between the flat plates, and boundaries of heat transfer unit are formed by the flat plate. And the Japanese Patent Gazette JP-A-Sho-36-21644 also discloses a heat exchanger wherein a high temperature fluid and a low temperature fluid are passed through the gaps, and heat exchange operation is performed via the heat transfer unit.

The conventional type heat exchanger has advantages in that it is simple in construction and lower in the manufacturing cost and has high thermal efficiency. On the other hand, the heat transfer unit is accommodated in a casing, and the casing and the heat transfer unit are welded together to ensure air-tightness and liquid-tightness. In this respect, the casing and the heat transfer unit cannot be disassembled, and it has been difficult to perform maintenance operation such as cleaning of the heat transfer unit.

SUMMARY OF THE INVENTION

It is an object of the present invention to provide a heat exchanger, which can be disassembled in simple manner and by which it is possible to perform maintenance operation such as cleaning in easier manner.

To attain the object as described above, a heat exchanger according to the present invention comprises a casing designed as a hollow box by a top plate, a bottom plate, a front plate, a rear plate, and two lateral plates, and a heat transfer unit accommodated in the casing, and in the heat exchanger, the heat transfer unit has flat plates alternately folded back in reverse direction, and a first flow passage and a second flow passage are alternately formed in multiple layers between the flat plates, and among the front plate and the rear plate running in parallel to a folding line of the flat plate of the casing, a high temperature fluid inlet and a high temperature fluid outlet to be communicated with the second flow passage are provided on the front plate side, and a low temperature fluid inlet and a low temperature fluid outlet to be communicated with the first flow passage are provided on the rear plate side, a lateral plate sealing member to cover the entire region of the end portion and a holding plate with rigidity are interposed between the lateral plate confronted with the end portion of the heat transfer unit and the heat transfer unit, a biasing means is provided between the holding plate and the lateral plate, the biasing means applies pressure on the lateral plate sealing member to the end portion of the heat transfer unit via the holding plate, and the lateral plate sealing member air-tightly closes the end portions of the first flow passage and the second flow passage.

Further, in the heat exchanger according to the present invention, the biasing means is a coil spring disposed at such distribution as required, a flange nut is inserted from a side of the holding plate of the coil spring, spring supporting bolts for inserting into the lateral plates are engaged with the flange nuts, and by tightening the spring supporting bolts and by compressing the coil spring, pressing force of the coil spring on the holding plate is restricted, and by loosening the spring supporting bolts, the restriction of the coil spring is released so that pressing force is applied on the holding plate.

Further, in the heat exchanger according to the present invention, edge holding hardwares are provided on the top plate and on the bottom plate of the casing, a flat plate on the uppermost portion and a flat plate on the lowermost portion of the heat transfer unit are folded back in a same direction, sealing members are engaged with a forward end of the flat plate of the uppermost portion and with a forward end of the flat plate of the lowermost portion respectively, the sealing members are held between the edge holding hardwares and the top plate, the sealing member is held between the edge holding hardwares and the bottom plate, and the heat transfer unit is fixed.

Further, in the heat exchanger according to the present invention, projections are protruded on front surface side and on rear surface side of the flat plate as folded back, a projection on the front surface side and a projection on the rear surface side of the confronted flat plates are brought face to face with each other, and a gap serving as a flow passage is formed between the confronted flat plates.

Further, a heat exchange system according to the present invention comprises a drying chamber, and a combustion apparatus installed inside the drying chamber and two heat exchangers installed in the drying chamber, and in the heat exchange system, a combustion gas from the combustion apparatus is processed by heat exchange operation with air inside the drying chamber via one heat exchanger and is discharged outside the drying chamber, outdoor air is taken in via the other heat exchanger, the air in the drying chamber is discharged via the other heat exchanger, and heat exchange operation is performed between the air taken in by the other heat exchanger and the discharged air.

Furthermore, in the heat exchange system according to the present invention, wherein indoor air is mixed with combustion gas flowing into the one heat exchanger, and temperature is regulated.

According to the present invention, the heat exchanger comprises a casing designed as a hollow box by a top plate, a bottom plate, a front plate, a rear plate, and two lateral plates, and a heat transfer unit accommodated in the casing, and in the heat exchanger, the heat transfer unit has flat plates alternately folded back in reverse direction, and a first flow passage and a second flow passage are alternately formed in multiple layers between the flat plates, and among the front plate and the rear plate running in parallel to a folding line of the flat plate of the casing, a high temperature fluid inlet and a high temperature fluid outlet to be communicated with the second flow passage are provided on the front plate side, and a low temperature fluid inlet and a low temperature fluid outlet to be communicated with the first flow passage are provided on the rear plate side, a lateral plate sealing member to cover the entire region of the end portion and a holding plate with rigidity are interposed between the lateral plate confronted with the end portion of the heat transfer unit and the heat transfer unit, a biasing means is provided between the holding plate and the lateral plate, the biasing means applies pressure on the lateral plate sealing member to the end portion of the heat transfer unit via the holding plate, and the lateral plate sealing member air-tightly closes the end portions of the first flow passage and the second flow passage. As a result, because the heat transfer unit is not fixed physically, maintenance operation such as cleaning can be easily performed.

Further, according to the invention, in the heat exchanger, the biasing means is a coil spring disposed at such distribution as required, a flange nut is inserted from a side of the holding plate of the coil spring, spring supporting bolts for inserting into the lateral plates are engaged with the flange nuts, and by tightening the spring supporting bolts and by compressing the coil spring, pressing force of the coil spring on the holding plate is restricted, and by loosening the spring supporting bolts, the restriction of the coil spring is released so that pressing force is applied on the holding plate. As a result, when the lateral plates are attached or removed, reaction force of the spring is not applied on the lateral plates, and the lateral plates can be attached and removed in easier manner.

Further, according to the invention, in the heat exchanger, edge holding hardwares are provided on the top plate and on the bottom plate of the casing, a flat plate on the uppermost portion and a flat plate on the lowermost portion of the heat transfer unit are folded back in a same direction, sealing members are engaged with a forward end of the flat plate of the uppermost portion and with a forward end of the flat plate of the lowermost portion respectively, the sealing members are held between the edge holding hardwares and the top plate, the sealing member is held between the edge holding hardwares and the bottom plate, and the heat transfer unit is fixed. As a result, because the heat transfer unit is not fixed physically by means such as welding, the manufacturing cost can be decreased.

Further, according to the invention, in the heat exchanger, projections are protruded on front surface side and on rear surface side of the flat plate as folded back, a projection on the front surface side and a projection on the rear surface side of the confronted flat plates are brought face to face with each other, and a gap serving as a flow passage is formed between the confronted flat plates. As a result, it would suffice that a height of the projection to form the flow passage may be one-half of the initial height, and this makes it easier to fabricate the flat plate and to reduce the manufacturing cost.

Further, according to the invention, the heat exchange system comprises a drying chamber, and a combustion apparatus installed inside the drying chamber and two heat exchangers installed in the drying chamber, and in the exchange system, a combustion gas from the combustion apparatus is processed by heat exchange operation with air inside the drying chamber via one heat exchanger and is discharged outside the drying chamber, outdoor air is taken in via the other heat exchanger, the air in the drying chamber is discharged via the other heat exchanger, and heat exchange operation is performed between the air taken in by the other heat exchanger and the discharged air. As a result, thermal energy generated by combustion can be effectively utilized.

Furthermore, according to the invention, in the heat exchange system, indoor air is mixed with combustion gas flowing into the one heat exchanger, and temperature is regulated. As a result, it is possible to reduce heat loss associated with temperature regulation.

BRIEF DESCRIPTION OF THE DRAWINGS

FIG. 4(A) is a drawing to show a condition of the heat exchanger where a right lateral plate is mounted and a spring is not opened. FIG. 4(B) is a drawing to show a condition where a right lateral plate is mounted and a spring is opened;

FIG. 5(A) shows a condition where the spring, the right lateral plate and the flange nut are disassembled, and FIG. 5(B) is a drawing to show a condition where the spring is completely compressed; and FIG. 6 is a schematical drawing to show an example of a heat exchanger system using the heat exchanger according to the present invention.

DETAILED DESCRIPTION OF THE PREFERRED EMBODIMENTS

Description will be given below on an embodiment of the present invention by referring to the attached drawings.

Figure 1:
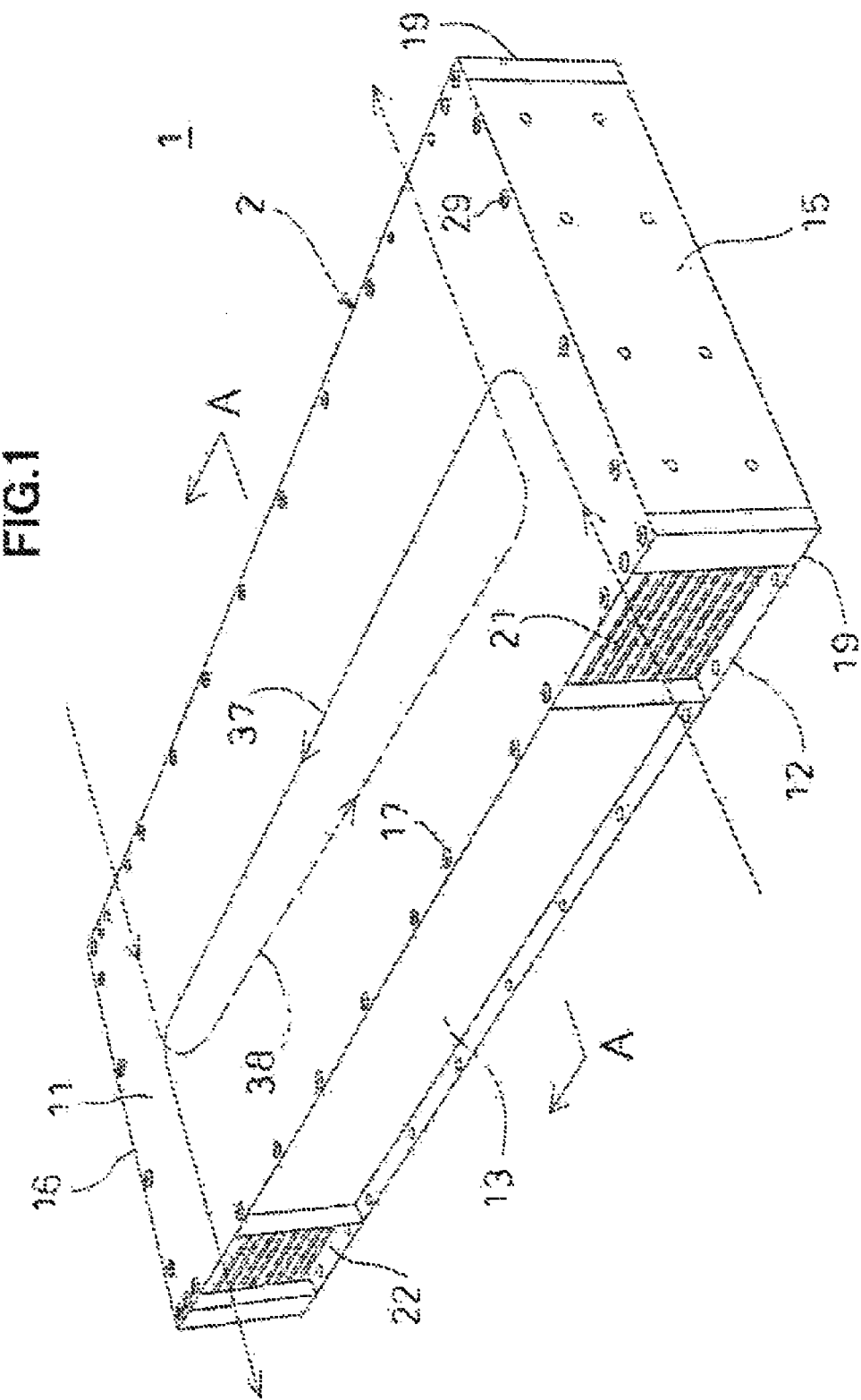
FIG. 1 is a perspective view of a heat exchanger according to an embodiment of the present invention.
Figure 2:
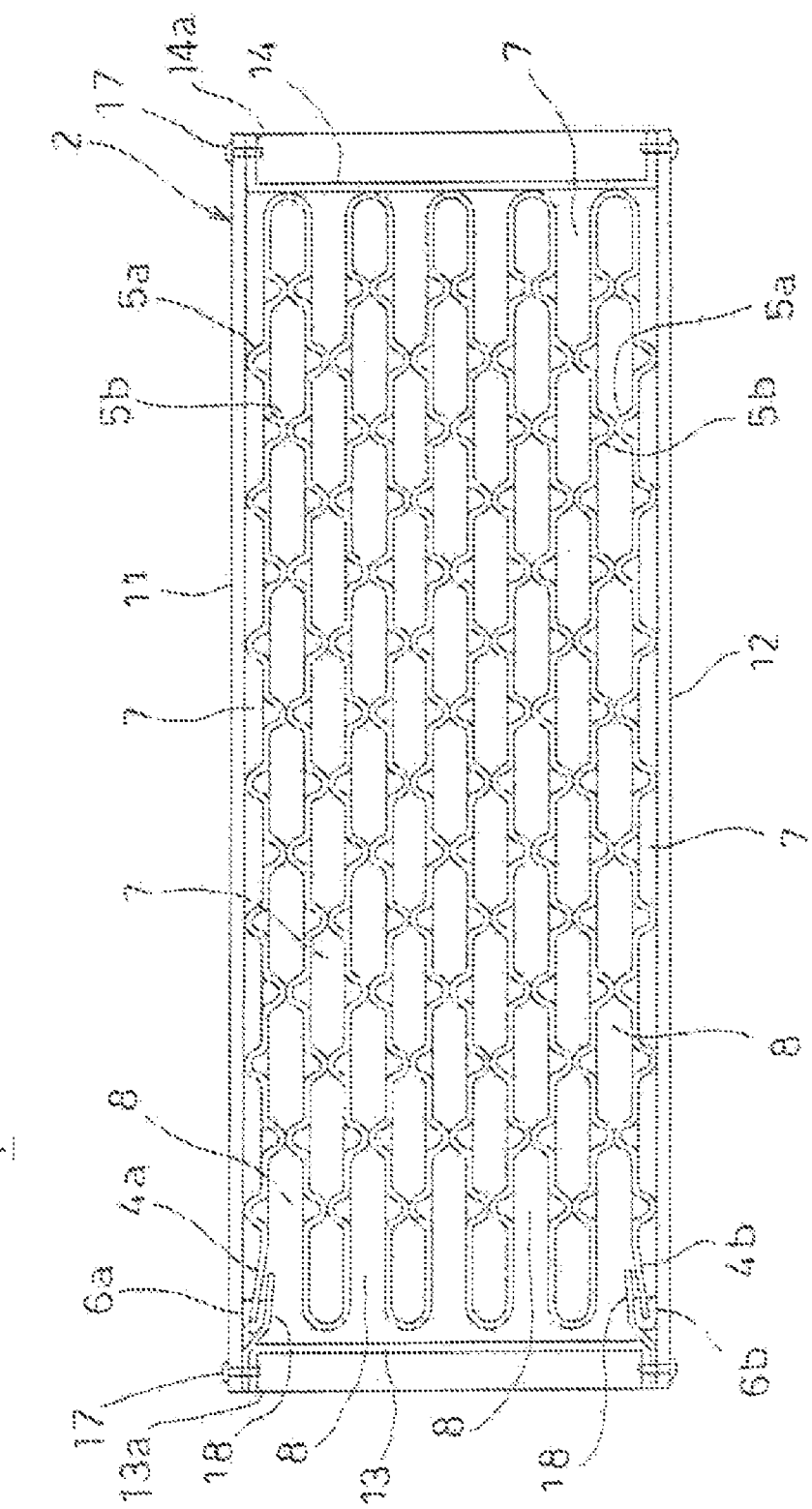
FIG. 2 is an arrow diagram along the line A-A in FIG. 1.
Figure 3:
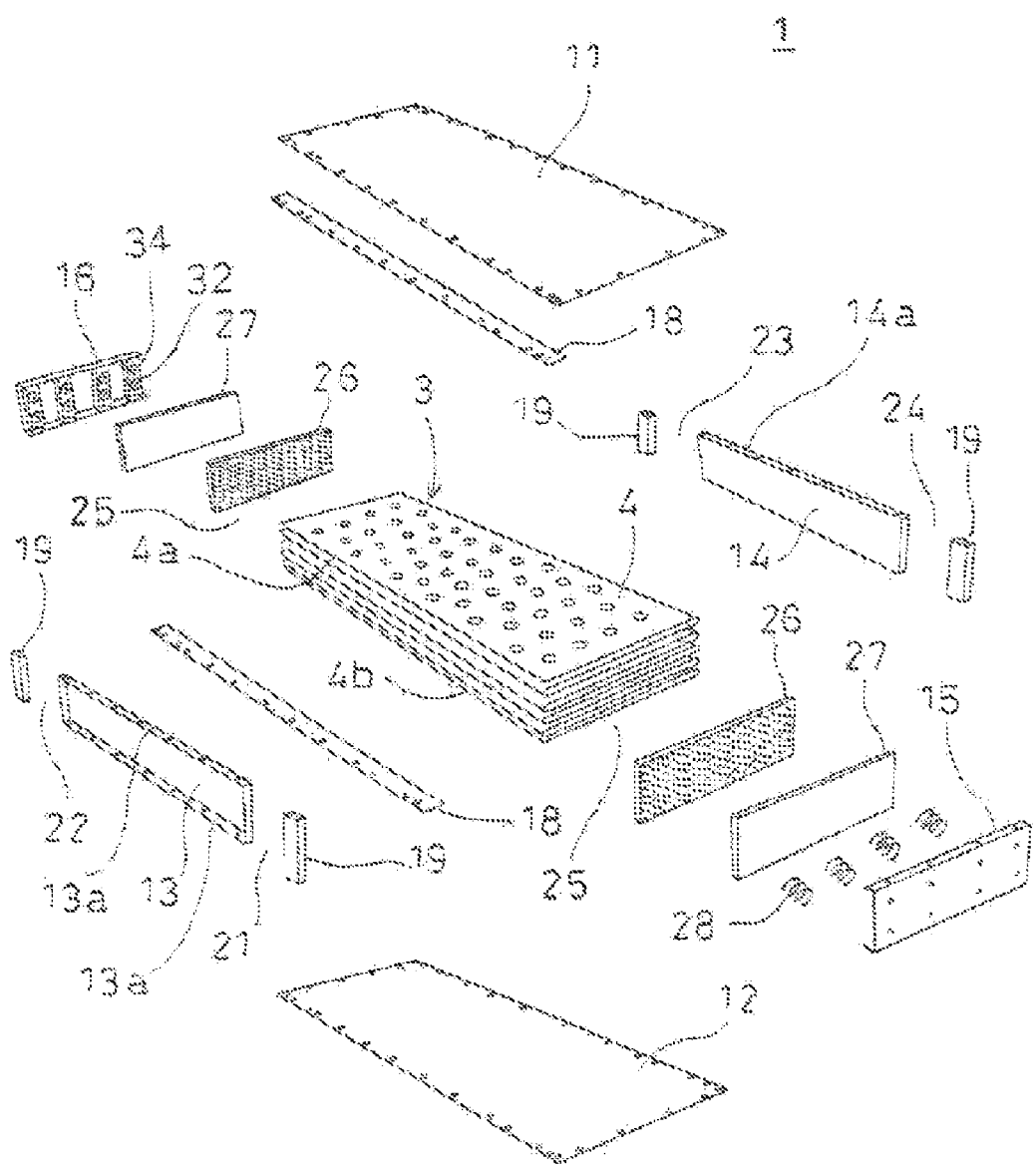
FIG. 3 is an exploded perspective view of the heat exchanger as given above.

First, referring to FIG. 1 to FIG. 3, description will be given on a heat exchanger, which is an embodiment of the present invention.

A heat exchanger 1 comprises a casing 2 configured by a hollow box and a heat transfer unit 3 accommodated within the casing 2.

The heat transfer unit 3 consists of a flat plate 4 made of a material with high thermal conductivity such as aluminum by folding the flat plate 4 alternately on each other in zigzag manner so as to be a multilayer plate. Folding lines of the flat plate 4 are consistent with each other in up-and-down direction so that the folding lines are included within same plane.

In the flat plate 4, projecting portions 5a and 5b are formed by presswork in a distribution as predetermined. The projecting portion 5a and the projecting portion 5b are formed alternately in two planar directions respectively. With the flat plate 4 in folded condition, the projecting portion 5a is projected toward upper surface side of the flat plate 4, and the projecting portion 5b is projected toward lower surface side so that the projecting portion 5a and the projecting portion 5b are brought face to face with each other. On the heat transfer unit 3, it is preferable that an end edge 4a on the uppermost layer of the flat plate 4 is on the same side as an end edge 4b of the lowermost layer (on left side in FIG. 2). On the end edges 4a and 4b, sealing members 6a and 6b, each designed to have a U-shaped cross-section, are fixed over total length. Each of the sealing members 6 is made of a highly elastic material having heat-resistant property, and a material such as silicone rubber is used, for instance.

Each of the end edges 4a and 4b is tilted toward upper side and toward lower side by an extent approximately equal to projecting height of the projecting portions 5a and 5b.

Between sites confronted each other of the flat plate 4, a gap is formed by the projecting portions 5a and 5b. This gap forms a first flow passage 7 and a second flow passage 8 as partitioned by the flat plate 4. As to be described later, a high temperature fluid passes through the first flow passage 7 and a low temperature fluid passes through the second flow passage 8.

The projecting portion 5 may be so designed that the projecting portion 5 is projected only in one direction. In this case, the projecting portion 5 must have a height twice as high as heights of the projecting portions 5a and 5b. If it is so arranged that the end edges 4a and 4b are projected to some extent beyond the folding lines of the flat plate 4 and the end edges 4a and 4b are butted against a front plate 13 (as to be described later) respectively, an edge holding hardware 18 may be omitted.

Next, description will be given on the casing 2. The casing 2 is primarily assembled by fixing a top plate 11, a bottom plate 12, a front plate 13, a rear plate 14, a right lateral plate (a lateral plate on right side with respect to the front plate 13 in FIG. 1) 15 and a left lateral plate 16 by using bolts 17. The top plate 11 and the bottom plate 12 run in parallel to a plane of the flat plate 4 of the heat transfer unit 3. The front plate 13 and the rear plate 14 run in parallel to a plane including the folding lines of the flat plate 4, and the right lateral plate 15 and the left lateral plate 16 are confronted with an end portion of the flat plate 4 (i.e. the heat transfer unit 3).

First, description will be given on assembling of the top plate 11 and the bottom plate 12 with the front plate 13 and the rear plate 14 respectively.

The front plate 13 and the rear plate 14 have edge portions 13a and 14a of four sides of the front plate 13 and the rear plate 14 respectively and the edge portion 13a and the edge portion 14a are folded at right angle in outer direction. Both the front plate 13 and the rear plate 14 are designed to be shorter than the top plate 11 and the bottom plate 12.

With the edge portion 14a fixed on the top plate 11 and on the bottom plate 12 by the bolt 17 respectively, the top plate 11 and the bottom plate 12 are assembled with the rear plate 14. The edge holding hardwares 18 are positioned between the edge portion 13a and the top plate 11 and between the edge portion 13a and the bottom plate 12 respectively. With the edge portion 13a fixed on the top plate 11 and the bottom plate 12 respectively by the bolt 17, the top plate 11 and the bottom plate 12 are assembled with the front plate 13. The edge holding hardwares 18 are fastened together between the edge portion 13a and the top plate 11 and between the edge portion 13a and the bottom plate 12 respectively. For the purpose of improving air-tightness, sealing members may be interposed between the edge portion 13a and the top plate 11 and between the edge portion 13a and the bottom plate 12 respectively.

The edge holding hardwares 18 and 18 are tilted so as to separate from the top plate 11 and the bottom plate 12 respectively, and so as to form a V-shaped groove between the hardwares and the top plate 11 and between the hardwares and the bottom plate 12 respectively.

As described above, the end edges 4a and 4b are tilted in upper direction and in lower direction by an extent approximately equal to projection height of the projecting portions 5a and 5b respectively. It is so arranged that the sealing member 6a is closely attached to the top plate 11 when the top plate 11 is brought into contact with the projecting portion 5a of the uppermost layer, and that the sealing member 6b is closely attached to the bottom plate 12 when the bottom plate 12 is closely fitted to the projecting portion 5b of the lowermost layer.

Under the condition that the end edges 4a and 4b are inserted into the V-shaped groove, the end edges 4a and 4b are sandwiched between the edge holding hardwares 18 and the top plate 11 and between the edge holding hardwares 18 and the bottom plate 12 respectively via the sealing members 6a and 6b. Under the condition that the end edges 4a and 4b are sandwiched, the sealing members 6a and 6b are compressed by the pressure as required.

At four corners of the top plate 11 and the bottom plate 12, support pillars 19, each designed to have a rectangular cross-section, are fixed by screws. A high temperature fluid inlet 21 and a high temperature fluid outlet 22 are formed between the two support pillars 19 on front side and the front plate 13. Also, a low temperature fluid inlet 23 and a low temperature fluid outlet 24 are formed between two support pillars 19 on rear side and the rear plate 14.

Now, description will be given below on assembling of the top plate 11 and the bottom plate 12 with the right lateral plate 15 and the left lateral plate 16 respectively.

The assembling of the right lateral plate 15 and the left lateral plate 16 is performed symmetrically and in the same structure with each other. Therefore, description will be given below on the assembling of the right lateral plate 15.

By arranging in such a manner that the heat transfer unit 3 is accommodated in a space formed by the top plate 11, the bottom plate 12, the front plate 13 and the rear plate 14, and that the end edges 4a and 4b of the heat transfer unit 3 are sandwiched by the edge holding hardwares 18, and the heat transfer unit 3 can be fixed on the top plate 11 and the bottom plate 12. Under this condition, openings 25 and 25 each in rectangular shape can be formed on the left and right by the top plate 11, the bottom plate 12, the front plate 13 and the rear plate 14 respectively.

The openings 25 can be closed by the right lateral plate 15 via a planar type lateral plate sealing member 26 and via a holding plate 27. The lateral plate sealing member 26 is used to cover the entire area of the end portion of the heat transfer unit 3, and end portions of the first flow passage 7 and the second flow passage 8 are air-tightly closed by the lateral plate sealing member 26. The lateral plate sealing member 26 is made of a highly elastic material with heat-resistant property, and silicone rubber is adopted, for instance. As the holding plate 27, a material with rigidity—a steel plate, for instance—is used.

The holding plate 27 is provided in such a manner that the holding plate 27 can be brought closer to or separated from (i.e. displaceable in left and right directions respectively) the heat transfer unit 3. A spring 28, i.e. a compression coil spring, is interposed between the holding plate 27 and the right lateral plate 15, and the lateral plate sealing member 26 is pressed on an end surface of the heat transfer unit 3 via the holding plate 27 by using the spring 28.

Description will be given below further by referring to FIG. 4(A), FIG. 4(B), FIG. 5(A) and FIG. 5(B).

The right lateral plate 15 has edge portions 15a, i.e. upper and lower two edge portions, which are bent at right angle in inner direction. By fixing the edge portions 15a on the top plate 11 and the bottom plate 12 respectively by means of bolts 29, the right lateral plate 15 are mounted on the top plate 11 and the bottom plate 12. For the purpose of increasing air-tightness, the sealing material may be interposed between the edge portion 15a and the top plate 11 and between the edge portion 15a and the bottom plate 12 respectively.

The right lateral plate 15 has biasing means to press the holding plate 27 on the lateral plate sealing member 26.

On inner surface of the right lateral plate 15, a spring holder 32, which is formed by bending a band-like plate member in U-shaped form, is fixed by means as required such as spot welding. An open end of the spring holder 32 is designed to face in inner direction and, a recessed groove 33 is formed. As many springs 28 as appropriate (in FIG. 3, two springs are shown at upper and lower positions respectively) are accommodated in the recessed groove 33. The spring holder 32 functions as a guiding member to hold the springs 28, which are biasing means, and the spring holder 32 also functions as a reinforcing member for the right lateral plate 15. The biasing means is not limited to the compression coil spring, and a plate spring or the like may be used.

A flange nut 34 is inserted from inside of the spring 28. The flange nut 34 has a nut portion 34a and a flange portion 34b. On outer lateral surface of the flange portion 34b, a tapered portion 34c is formed, and it is so designed that the tapered portion 34c is engaged with inner diameter of the spring 28, and that a center of the tapered portion 34c matches well with a center of the spring 28.

From outside of the right lateral plate 15, a spring supporting bolt 35 is inserted so that the spring supporting bolt 35 is engaged with the nut portion 34*a*.

Figure 5A:
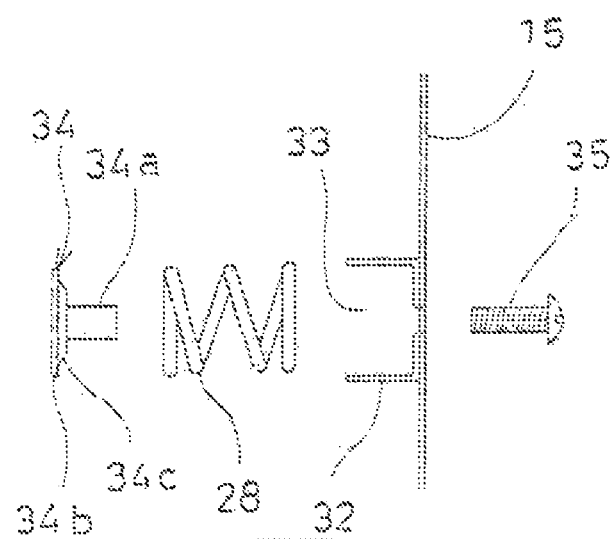
FIG. 5(A) and FIG. 5(B) represent a relation among a spring, a right lateral plate and a flange nut.
Figure 5B:
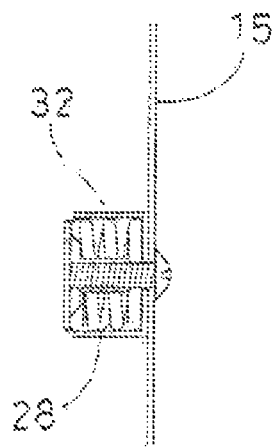

The spring 28 is accommodated in the recessed groove 33, and the flange nut 34 is inserted into the spring 28. Further, the spring supporting bolt 35 is engaged with the flange nut 34, and the spring supporting bolt 35 is tightened. As a result, the flange nut 34 is displaced toward the right lateral plate 15, and the spring 28 is compressed and deformed. FIG. 5(B) shows a condition where the spring 28 is sufficiently deformed and is accommodated in the recessed groove 33, and a forward end surface of the flange portion 34*b* is brought approximately on the same level as an inner end of the spring holder 32. It is understood that all of the springs 28 are under the condition as shown in FIG. 5(B).

The lateral plate sealing member 26 and the holding plate 27 are sequentially inserted into the opening 25. All of the springs 28 are accommodated in the recessed groove 33, and the right lateral plate 15 is set into the opening 25. Then, the right lateral plate 15 is fixed on the top plate 11 and the bottom plate 12 by means of the bolts 29.

Under this condition, the springs 28 are restricted and no pressing force is applied on the holding plate 27. That is, the right lateral plate 15 receives no reaction force from the holding plate 27. As a result, positioning can be easily achieved when the right lateral plate 15 is mounted, and the right lateral plate 15 can be mounted in easier manner.

When the mounting of the right lateral plate 15 is completed, the spring holding bolts 35 are loosened, and the springs 28 are brought into free condition. Even under the condition where the restriction by the spring holding bolts 35 are left free, the springs 28 are maintained in compressed state, and the restoring forces of the springs 28 are transmitted to the lateral plate sealing member 26 via the holding plate 27. Because the lateral plate sealing member 26 is made of a highly elastic material, a portion where the end surface of the flat plate 4 is brought into contact is recessed by the restoring forces of the springs 28. As a result, each of four end surfaces of the flat plate 4 is engaged into the lateral plate sealing member 26, and the end surfaces of the heat transfer unit 3 are totally closed in air-tight manner by the lateral plate sealing member 26.

The holding plate 27 is not supported physically and is kept in free condition. Because the holding plate 27 is pressed by a number of springs 28, the holding plate 27 is uniformly brought into touch with end portion of the heat transfer unit 3, and uniform sealing property can be maintained over the entire end portion. Each of the springs 28 is deformed by the spring supporting bolt 35, and strong force is not required for the deforming. On the other hand, a number of springs 28 are provided with such distribution as required. As a result, high pressing force and uniform pressing force can be applied on the lateral plate sealing member 26 as a whole.

Figure 4A:
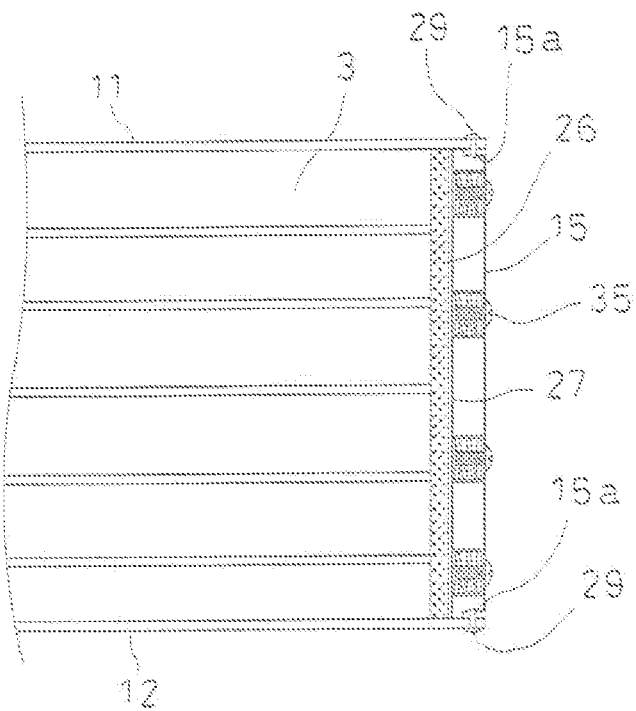
FIG. 4(A) and FIG. 4(B) each represents a partial cross-sectional view of an end portion of the heat exchanger.
Figure 4B:
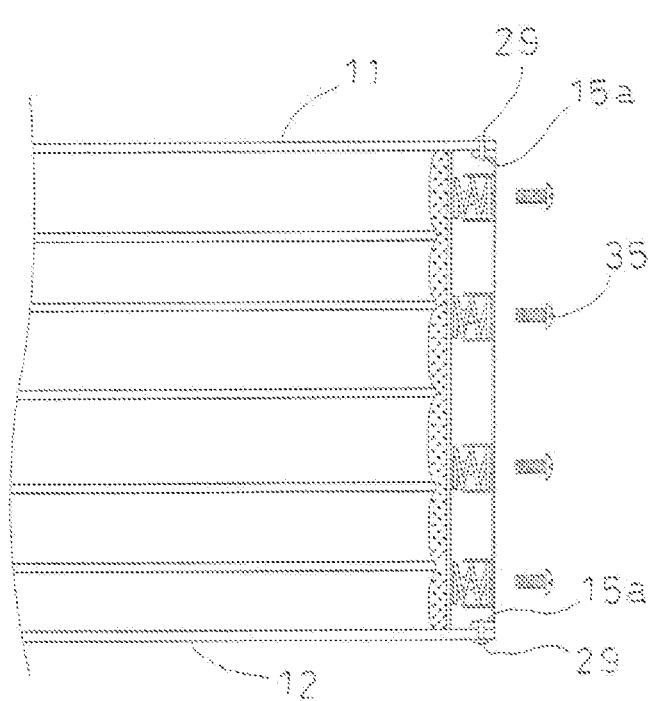

In FIG. 4(B), the spring holding bolt 35 is shown in completely removed state. In fact, however, a forward end of the spring supporting bolt 35 is engaged with the nut portion 34*a*. That is, a head of the spring supporting bolt 35 is separated from the right lateral plate 15. Therefore, even when the restriction by the spring supporting bolt 35 is released, the position of the springs 28 in vertical direction is maintained by the spring supporting bolt 35.

By assembling the top plate 11, the bottom plate 12, the front plate 13, the rear plate 14, the right lateral plate 15, and the left lateral plate 16 respectively, the assembling of the heat exchanger 1 is completed. The fixing of the heat transfer unit 3 can be accomplished by holding the end edges 4*a* and 4*b* by means of the edge holding hardwares 18 and 18 on the top plate 11 and the bottom plate 12, and there is no need to use the means such as screwing, welding, etc. Further, at the same time as the fixing of the heat transfer unit 3, the first flow passage 7 and the second flow passage 8 can be air-tightly separated from each other because the sealing members 6*a* and 6*b* are engaged with the end edges 4*a* and 4*b*. On the left end and the right end of the heat transfer unit 3, each of the lateral plate sealing members 26 is pressed and is air-tightly sealed. As a result, by simply mounting the heat transfer unit 3 into the casing 2, the first flow passage 7 and the second flow passage 8, being air-tightly separated from each other by the heat transfer unit 3, can be provided.

The high temperature fluid inlet 21 and the high temperature fluid outlet 22 are communicated with the second flow passage 8, and the low temperature fluid inlet 23 and the low temperature fluid outlet 24 are communicated with the first flow passage 7.

High temperature fluid 37 is allowed to flow in from the high temperature fluid inlet 21, to pass through the second flow passage 8, and to discharge out of the high temperature fluid outlet 22. A low temperature fluid 38 is allowed to flow in from the low temperature fluid inlet 23, to pass through the first flow passage 7, and to discharge out of the low temperature fluid outlet 24. Heat exchange operation is performed between the high temperature fluid 37 and the low temperature fluid 38 during the process where the fluids pass through the second flow passage 8 and the first flow passage 7.

Heat exchange operation is performed between the high temperature fluid 37 and the low temperature fluid 38 via the heat transfer unit 3, and the low temperature fluid 38 is heated up by the high temperature fluid 37.

In the embodiment as described above, heat loss is taken into account, and the low temperature fluid 38 is passed through the first flow passage 7 adjacent to the top plate 11 and the bottom plate 12. However, when the heat exchanger 1 itself is disposed inside a drying chamber 41 as to be described below, the high temperature fluid 37 may be passed through the first flow passage 7.

In the embodiment as described above, it is so arranged that the high temperature fluid 37 and the low temperature fluid 38 are passed through in counter-flow direction while these fluids may be passed through in forward direction.

Next, in case the high temperature fluid is a combustion gas, for instance, it is desirable that maintenance operation such as cleaning is performed in order to maintain performance characteristics of the heat exchanger 1 because the heat transfer unit 3 and internal surface of the casing 2 may be contaminated by soot and dust or the like contained in the combustion gas.

In the heat exchanger 1 according to the present embodiment, disassembling can be carried out in simple manner and the heat transfer unit 3 can be easily taken out.

To perform disassembling procedure, the procedure to assemble the heat exchanger 1 should be performed in reverse sequence. Specifically, the spring supporting bolt 35 is fastened at first, and under the condition where reaction force of the spring 28 is not applied on the right lateral plate 15, and similarly, under the condition where reaction force of the spring 28 is not applied on the left lateral plate 16, the right lateral plate 15 and the left lateral plate 16 are disassembled. By disassembling the top plate 11 and the bottom plate 12 from the front plate 13, the rear plate 14 and the supporting pillars 19 and 19, all component parts to constitute the heat exchanger 1 can be disassembled (see FIG. 3).

Therefore, cleaning operation can be performed for each of the component parts, and cleaning operation can be executed in simple and perfect manner.

Next, description will be given on an example of a heat exchanger system using the heat exchanger 1 as described above.

FIG. 6 shows a case where the heat exchanger 1 according to the present embodiment is applied for the heating in a drying chamber for operation of baking painting (baking finish).

In FIG. 6, reference numeral 41 represents a drying chamber, and numeral 42 represents a combustion apparatus. The combustion apparatus 42 is disposed inside the drying chamber 41, and an air for combustion 43 is taken from outside the drying chamber. The interior of the drying chamber 41 is maintained at 150° C., for instance.

Fuel such as petroleum, gas, etc. is burned in the combustion apparatus 42, and the discharged combustion gas will be used as heat source. Because the combustion gas discharged from the combustion apparatus 42 is at high temperature, the combustion gas is mixed with the air 44 in the drying chamber 41 and is adjusted to the temperature as adequate. Then, the combustion gas is sent to a first heat exchanger 1a as the high temperature fluid 37. After heat exchange operation is performed at the first heat exchanger 1a, the combustion gas is discharged outside of the drying chamber 41. Indoor air is sent to the first heat exchanger 1a as the low temperature fluid 38. Then, heat exchange operation is performed at the first heat exchanger 1a, and the indoor air is set to high temperature (e.g. 150° C.) and is sent back into the chamber.

During the process of the baking painting, a solvent for paint is volatilized as gas. Because the solvent is a combustible gas, a concentration of the solvent in the drying chamber 41 must be diluted to such degree that the solvent may not be ignited. Therefore, a second heat exchanger 1b is provided in the present embodiment. The second heat exchanger 1b takes an external air 45 via the second heat exchanger 1b into the drying chamber 41. Then, the air 44 in the drying chamber 41 is discharged via the second heat exchanger 1b, and the air in the drying chamber 41 is ventilated. Because heat exchange operation is performed between the air 44 and the external air 45 in the chamber during the process of the ventilation, it is possible to decrease heat loss. Because the combustion apparatus 42 is installed inside the drying chamber 41, the interior of the chamber is heated by the heat generated during the combustion, and it is possible to decrease the heat loss.

In the heat exchange system as described above, a fan to let the gas flow is not described, but it is needless to say that a ventilation fan is to be installed as appropriate to let the high temperature fluid and the low temperature fluid flow to the heat exchangers 1a and 1b.

According to the heat exchanger system of the present embodiment, it is possible to effectively utilize thermal energy caused by combustion and to decrease the heat loss associated with temperature regulation.

The invention claimed is:

1. A heat exchanger, comprising:

a casing and a heat transfer unit accommodated within said casing, wherein said casing is assembled into a hollow box using a top plate, a bottom plate, a front plate, and a rear plate and two lateral plates, which are separated from each other, said lateral plates having two recessed lateral surfaces, where said lateral plates are fixed by bolts to the top plate and to the bottom plate where the front plate and the rear plate are fixed by bolts to the top plate and the bottom plate;

wherein said heat transfer unit comprises flat plates alternately folded back in reverse direction, and a first flow passage and a second flow passage are alternately formed between said flat plates, and among the front plate and the rear plate running in parallel to a folding line of said flat plate of said casing, a high temperature fluid inlet and a high temperature fluid outlet to be communicated with the second flow passage are provided on said front plate side, and a low temperature fluid inlet and a low temperature fluid outlet to be communicated with said first flow passage are provided on said rear plate side;

a first sealing arrangement for air-tightly sealing the front plate of said casing to said heat transfer unit and for air-tightly sealing said first flow passage from said second flow passage, comprising:

a first edge holding hardware disposed between the top plate and the front plate and a second edge holding hardware disposed between the bottom plate and the front plate;

a first forward end of a flat plate on an uppermost portion and a second forward end of a flat plate on a lowermost portion of said heat transfer unit, said first forward end and second forward end facing the front plate of said casing are folded back towards the top plate and the bottom plate, respectively;

an upper sealing member and a lower sealing member engaged with said first forward end of said flat plate on the uppermost portion and with said second forward end of said flat plate on the lowermost portion, respectively;

wherein said upper sealing member has a first portion disposed between the top plate and said first forward end of the flat plate and a second portion disposed between said first forward end and said first edge holding hardware, and said lower sealing member has a first portion disposed between the bottom plate and said second forward end of the flat plate and a second portion disposed between said second forward end and said second edge holding hardware;

wherein a first V-shaped groove is formed between the top plate and said first edge holding hardware and a second V-shaped groove is formed between the bottom plate and said second edge holding hardware; and wherein said upper sealing member is inserted into said first V-shaped groove and held between said first edge holding hardware and the top plate, and wherein said lower sealing member is inserted into said second V-shaped groove and held between said second edge holding hardware and the bottom plate, such that said heat transfer unit is fixed in place; and a second sealing arrangement for air-tightly sealing the lateral plates of said casing to the heat transfer unit, comprising:

a lateral plate sealing member covering an entire region of an end portion of said heat transfer unit and a holding plate with rigidity are each interposed between a respective one of said lateral plates and said heat transfer unit;

two or more coil springs are provided between said holding plate and said respective lateral plate, a flange nut is disposed between said holding plate and each of said coil springs, spring supporting bolts for freely inserting into said lateral plates and for engaging with said flange nuts, wherein said coil springs and said lateral plate are connected by said spring supporting bolts and said coil springs exert a pressing force against said holding plates via said flange nuts, and wherein by tightening said spring supporting bolts and compressing said coil springs, said flange nuts are separated from said holding plate, and said pressing force of said coil springs on said holding plate is restricted, and by loosening said spring supporting bolts, the restriction of said coil springs is released so that said pressing force of said coil springs is applied to said holding plate via said flange nuts, and when all of said spring supporting bolts are loosened, said coil springs apply pressure on said lateral plate sealing member at the end portion of said heat transfer unit via said holding plate, and said lateral plate sealing member air-tightly closes the end portions of said first flow passage and said second flow passage.

2. A heat exchanger according to claim 1, further comprising projections protruding from front surface sides and rear surface sides of said flat plate as it is folded back, such that a projection on the front surface side and a projection on the rear surface side of said confronted flat plates are brought face to face with each other, and a gap serving as said first flow passage or said second flow passage is formed between said confronted flat plates.

3. A heat exchange system, comprising a drying chamber, and a combustion apparatus installed inside said drying chamber, a first heat exchanger as set forth in claim 1 and installed in said drying chamber and a second heat exchanger as set forth in claim 1, wherein a combustion gas from said combustion apparatus is processed by heat exchange operation with air inside the drying chamber via said first heat exchanger and is discharged outside the drying chamber, and wherein outdoor air is taken in via said second heat exchanger, the air in said drying chamber is discharged via said second heat exchanger, and heat exchange operation is performed between the air taken in by said second heat exchanger and the discharged air.

4. A heat exchange system according to claim 3, wherein indoor air is mixed with combustion gas flowing into said first heat exchanger, and temperature is regulated.

* * * * *